United States Patent [19]

Ito et al.

[11] 4,347,408

[45] Aug. 31, 1982

[54] MULTI-FREQUENCY SIGNAL RECEIVER

[75] Inventors: Hiroko Ito, Tokyo; Eiji Ohira, Hachiouji; Akira Ichikawa, Kokubunji, all of Japan

[73] Assignees: Nippon Telegraph and Telephone Public Corporation; Hitachi, Ltd., both of Tokyo, Japan

[21] Appl. No.: 97,697

[22] Filed: Nov. 27, 1979

[30] Foreign Application Priority Data

Dec. 6, 1978 [JP] Japan .............................. 53-149943

[51] Int. Cl.³ ............................................ H04M 1/50
[52] U.S. Cl. .............................................. 179/84 VF
[58] Field of Search ................... 179/84 VF, 15.55 T; 370/110; 340/171 R; 328/138

[56] References Cited

U.S. PATENT DOCUMENTS

3,578,919  5/1971  O'Neill .......................... 179/84 VF
3,773,981  11/1973  Stilwell et al. ..................... 370/110
3,931,480  1/1976  Poole ............................ 179/84 VF Primary Examiner—Joseph A. Popek
Attorney, Agent, or Firm—Craig and Antonelli

[57] ABSTRACT

A multi-frequency signal receiver, in which the digital input signals having the sampling frequency of 8 KHz or a multiple thereof are resampled at a sampling frequency of 4 KHz by means of a resampling circuit and in which the signals thus resampled are subjected to the band selection by means of a digital filter so that the frequency of the input signals may be identified.

5 Claims, 15 Drawing Figures

MULTI-FREQUENCY SIGNAL RECEIVER

BACKGROUND OF THE INVENTION

1. Field of the Invention

The present invention relates to a multi-frequency signal receiver responsive to multi-frequency signaling in an audio-frequency band for transmitting multiple pieces of information in the form of multi-frequency tone signals with the use of an audio-frequency band, and more particularly to a multi-frequency signal receiver which is suitable for receiving push button dial signals (which will be referred to herein as "PB signals").

2. Description of the Prior Art

The PB signals transmitted from a telephone of the push-button type have the digits 0 to 9 and several symbols, each of which correspond to one of the combinations in frequencies between the low frequency group including 697 HZ, 770 Hz, 852 Hz and 941 Hz and the high frequency group including 1209 Hz, 1336 Hz, 1477 Hz and 1633 Hz.

In a time-division-multiplexed switching exchanger using pulse code modulation (PCM) as signals, the PB signals of such kind are converted to digital signals, which are transmitted to the receiver through a switching network and each time-division channel. As a receiving system for receiving the PB signals thus converted, there have conventionally been proposed (1) a counter method for detecting the signal frequencies from the measurements of the time intervals between alternate zero-crossings of the input waveform, (2) a PARCOR method for extracting the partial correlation coefficients of an input speech signal to analyze and (3) process the same, and a digital filter method, in which the construction of an analog type receiver is replaced by a digital one.

In case the multi-frequency receiver is realized using the above methods, the most important point to be considered is concerned with accuracy and economy. If the foregoing methods are examined from this standpoint, it is impossible for the counter method to attain the desired accuracy with a sampling frequency of 8 KHz for the PCM. If the observation period is elongated to enhance the accuracy, there arises a problem in that the observation period exceeds a predetermined signal continuation period.

According to the PARCOR method, on the other hand, the processing becomes so complex as to complicate the construction necessary for the processing with the resultant problem in the economy that the cost for the receiver per line becomes high.

According to the digital filter method, however, the desired accuracy can be attained for the pulse-code-modulated signals having a sampling frequency of 8 KHz. Thus, the economical realization of the digital filter method has heretofore been desired.

According to the digital filter method of the conventional type, the digitally coded PB signals having been sampled at the sampling frequency of 8 KHz are separated into two high and low frequency groups with the use of high and low frequency elimination filters, and these two frequency groups are supplied through limiters to band pass filters for the respective PB signal frequencies so that the signal frequencies may be detected. Since, in this conventional method, the digital signals of the sampling frequency of 8 KHz are processed as they are, there arises a problem in that the multiple signal processing capacity can not assume such a high level with the result that the receiver cost for each line becomes relatively high.

SUMMARY OF THE INVENTION

It is therefore a major object of the present invention to provide a multi-frequency signal receiver, in which the processing quantity per signal is reduced while remarkably raising the multiple grade so that the receiver cost for each line is remarkably reduced.

Another object of the present invention is to provide a multi-frequency signal receiver, in which the highly accurate signal detection is made possible while remarkably reducing the receiver cost for each line.

In order to attain the aforegoing objects, according to a primary feature of the present invention, in view of the fact that the PB signals can exist only in the band lower than 2 KHz, i.e., about 600 to 1700 Hz, there is provided resampling means for resampling the digitally converted signals having 8 KHz or several times of the sampling frequencies so that they may have the sampling frequency of 4 KHz. The signals thus resampled are then processed to reduce the processing quantity so that the receiver cost may be remarkably reduced.

In addition to the aforementioned primary feature, according to a secondary feature of the present invention, as limiter means for limiting the amplitude of the digital signals from the resampling means, there is used means for generating signals of preset negative or positive level in accordance with the positiveness and negativeness of the signals, if the time period for which the signals from the resampling means exceeds a preset positive or negative threshold value is shorter than a reference time period, and for generating either of the input signals as they are or the signals of a preset level if that time period is longer than the reference time period, thus improving the signal detecting accuracy.

In addition to the aforementioned features, according to a third feature of the present invention, a low frequency group pass filter and/or a high frequency group pass filter are used as the filters for separating the digital signals from the resampling means into the low frequency groups and the high frequency groups so that the receiver cost may be further reduced.

DESCRIPTION OF THE PREFERRED EMBODIMENTS

Figure 1:
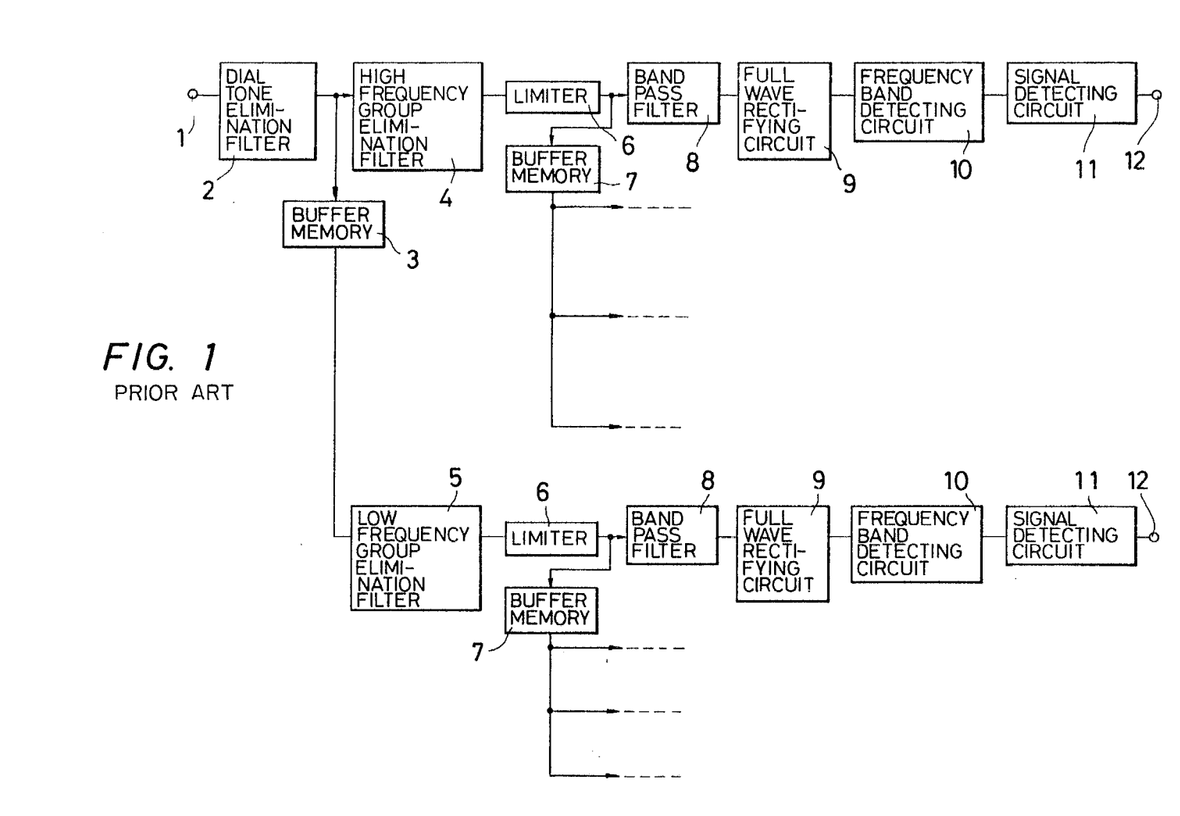
FIG. 1 is a block diagram showing a multi-frequency signal receiver according to the prior art.

FIG. 1 shows the construction of a PB signal receiver of digital filter type according to the prior art.

As shown in FIG. 1, the digitally converted PB signals having a sampling frequency of 8 KHz fed from a terminal 1 is divided, after having passed through a dial tone elimination filter 2, the two halves, which are then fed to a high frequency group elimination filter 4 and a low frequency group elimination filter 5. The signals thus separated into the two high and low frequency groups have their dynamic ranges depressed by a limiter 6, and each of the signals is divided into three or four signals, which are then fed to a band pass filter 8 provided for each PB signal frequency. In order to facilitate the observation, one of the high group and one of the low groups are shown in FIG. 1, but the remaining groups are omitted.

The output of the filter 8 is rectified by a full wave rectifying circuit and then is compared with a preset range level by means of a frequency band detecting circuit 10 so that the existence of the input of the PB signal frequency is judged. The output of this frequency band detecting circuit 10 is fed to a signal detecting circuit 11 so that the signal length is measured, in case there is an input, and that the output is fed to a terminal 12 of the corresponding frequency if a guard time is exceeded.

Generally speaking, the various filters 2, 4 and 5 are realized by using such digital filters in a time dividing manner as are disclosed in a Japanese Laid-Open Patent Publication No. 52-44106. Buffer memories 3 and 7 are provided to temporarily hold the intermediate results of those filters. Moreover, the digital signals of plural lines are fed from the input terminal 1 and are multiply processed by the aforementioned circuit.

In the PB signal receiver according to the prior art, since the digital signals having the sampling frequency of 8 KHz are processed as they are, there arises a problem that the multiply processing capacity of the signals cannot be increased so highly as to raise the receiver cost to a relatively high level.

Figure 2:
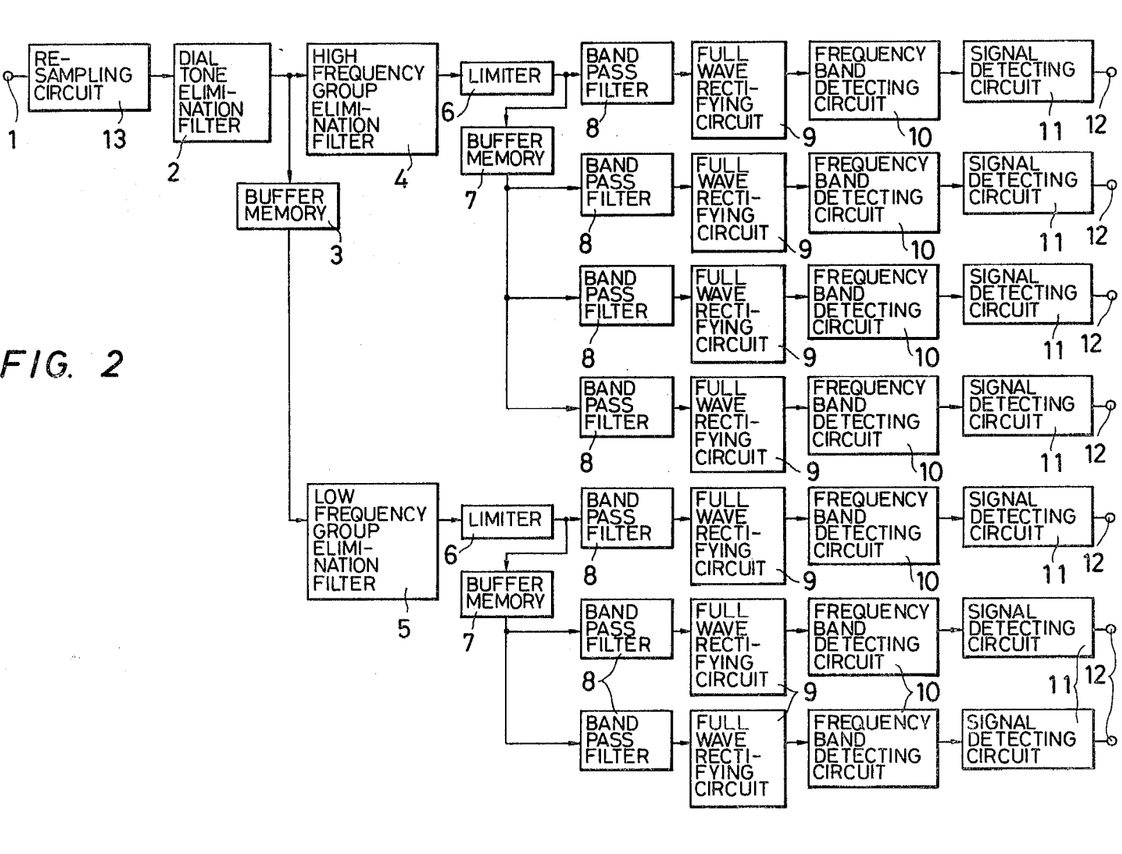
FIG. 2 is a block diagram showing one embodiment of the multi-frequency signal receiver according to the present invention.

Turning now to FIG. 2, the construction of one embodiment of the PB signal receiver according to the present invention will be described in the following. Reference numeral 1 indicates an input terminal. Indicated by numeral 2 is a dial tone elimination filter for the dial sound component of 400 Hz which is mixed into the digitally converted PB signals. Numerals 3 and 7 indicate buffer memories. Numerals 4 and 5 indicate a high frequency group elimination filter and a low frequency group elimination filter, respectively. Numeral 6 indicates a limiter for limiting the amplitude of the signals fed thereto. Numeral 8 indicates a band pass filter which is provided for each signal of the PB signals. Numerals 9, 10, 11 and 12 indicate a full wave rectifying circuit, a frequency band detecting circuit, a signal detecting circuit, and a signal output terminal, respectively. The construction of the circuit thus described with reference to FIG. 2 is the same as that of the conventional circuit of FIG. 1. Each of the filters 2, 4, 5 and 8 is a second order recursive digital filter such as is disclosed in the Japanese Laid-Open Patent Publication No. 52-44106. Among the above filters, the dial tone elimination filter 2 is constructed of a fourth order recursive digital filter by effecting two filtrations through the aforementioned filter. The high frequency group elimination filter 4 and the low frequency group elimination filter 5 are constructed of a sixth order recursive digital filter by effecting three filtrations through the aforementioned filter. Moreover, the band pass filter 8 is constructed of a second order recursive digital filter by the once filtration through the aforementioned filter.

In the construction thus far described, according to the present invention, a resampling circuit 13 is provided at a stage prior to the dial tone elimination filter 2 so that the digital signals fed from the input terminal 1 and having the sampling frequency of 8 KHz or a multiple thereof may be thinned out and converted into signals having a sampling frequency of 4 KHz.

In FIG. 2, the digitally converted PB signals, which are generated by the sampling process with the sampling frequency of 8 KHz or multiples thereof, are thinned out, when they are fed from the input terminal 1, with the sampling frequency of 4 KHz and are sampled with the same frequency of 4 KHZ so that they are separated through the high and low frequency group elimination filters 4 and 5 into two low and high frequency groups. And, the signals thus separated are fed to the limiter 6 to have their dynamic ranges depressed and then are fed to the band pass filter 8 which is provided for each of the frequencies of the PB signals. The signals having passed through filters 8 are subjected to full wave rectification by means of the full wave rectification circuit 9 and are compared with a preset threshold value in the frequency band detecting circuit 10 so that the existence of the PB signals are judged. Then, the signal length is measured by the signal detecting circuit 11 so that the output is generated at the terminal of the corresponding frequency if the guard time is exceeded.

Figure 3:
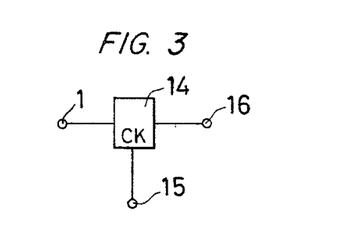
FIG. 3 is a simplified illustration showing the construction of one example of a resampling circuit shown in FIG. 2.

The sampling frequency of the digitally converted PB signals to be used in a telephone is 8 KHz or, in a special case, a multiple thereof. However, the resampling circuit 13 is made operative to convert the sampling frequency of the input signals into 4 KHz and is constructed of a latch circuit 14, as shown in FIG. 3, so that the signals from the input terminal 1 are latched in the latch circuit 14 for each clock signal of 4 KHz fed to an input terminal 14 and are generated at an output terminal 16.

As has been described hereinbefore, the PB signals can exist only in the frequency band lower than 2 KHz, i.e., about 600 to 1700 Hz. In the digital circuit, moreover, the frequency characteristics are made symmetrical about the half $f_s/2$ of the sampling frequency $f_s$. Thus, even if the PB signals thus fed are sampled with the frequency of 4 KHz so that the resultant signals are processed, there is established little erroneous reception between the PB signals thereby to provide substantially acceptable detection response.

As has been described in the above, in this case, if it is considered that the PB signals can exist only in the frequency band lower than 2 KHz and that the signals causing the erroneous operations due to speech waveforms have their spectra complicated by folding thereby to effect speech immunity, it is not necessary that the low pass filter for preventing the folded noises be provided at a stage prior to the resampling circuit.

As has been described hereinabove, according to the above embodiment, by the provision of a resampling circuit, the digitally converted PB signals are processed in a resampled manner with the sampling frequency of 4 KHz so that the practically acceptable receiving accuracy can be obtained. In case, however, more strict standards are required, there is a possibility that such receiving accuracy is not always sufficient. In order to cope with such problem, a special device is made in the limiter 6 according to the present invention, as will be described in the following.

Normally, the levels of the respective frequency components of the PB signals to be fed to and received by the receiver are not constant. More specifically, it is necessary to similarly detect the signals of the levels within a preset range and accordingly to standardize the signal levels during the signal processing. For this purpose, the limiter 6 is provided according to the present invention.

Figure 4:
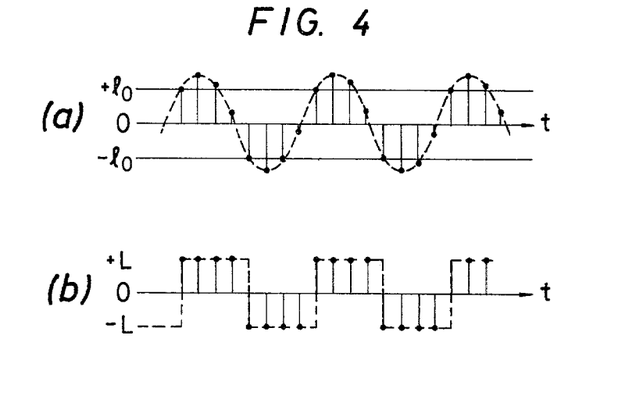
FIGS. 4, consisting of a and b, and 5, consisting of a and b, are waveform charts illustrating the operating principles of limiters according to the prior art and the present invention.

If the conventional limiter of this type is fed with such PB signals as shown in broken line in FIG. 4(a) as has been sampled in the manner shown in a solid line in FIG. 4(a), the signal output levels are changed between $+L$ and $-L$ in the manner shown in FIG. 4(b) each time the input signals exceed preset threshold values $+l_o$ and $-l_o$ so that the input sine waves are converted into square waves of a preset level.

The conventional limiter thus described is considerably effective in case the digitally converted sampling frequency is high, i.e., in case the sample number per signal wave is large. In case, however, the sampling frequency is low, there may exist no sample point during the time period while the input signals are higher than the threshold values so that the frequency components cannot be transmitted accurately to the subsequent stage. Even if, moreover, the signs of the input signals are inverted, they are processed as though they are not inverted so long as the values of the input signals do not exceed the threshold values so that the output signals do not reflect accurately the waveforms of the input signals.

Figure 5:
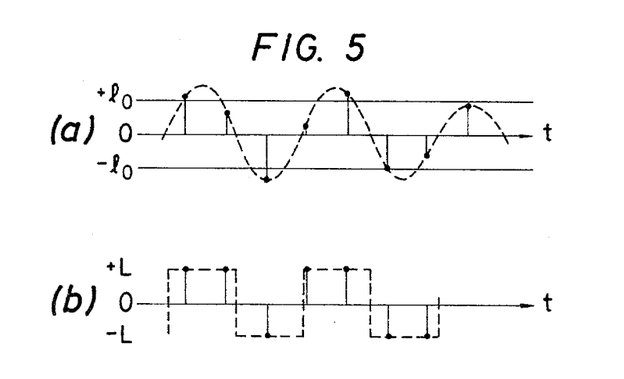

According to the present invention, therefore, in case such signals shown in broken line in FIG. 5(a) as have been sampled in the manner shown in solid lines in the same Figure are received, they are converted into square waves as shown in broken line in FIG. 5(b) at the instant when the signals exceed the threshold values $+l_o$ and $-l_o$ and the plus and minus signs of the subsequent signals.

More specifically, in case the PB signals are higher than a preset level, the maximum sampling number n from the time when the sample values of the signals exceed the threshold values $+l_o$ and $-l_o$ and to the time when they exceed again is determined in the following manner.

If the input signals are ideal sine waves having a frequency $\omega$ and are an amplitude a and expressed by a cos $\omega t$ and if the time when they first exceed the threshold values is shifted $\pm \phi$ from the maximum amplitude time of the signals, the maximum sampling number n is defined in Equations (1) and (2) in view of the characteristics of the sine waves:

$$a \cos (\omega Tsn \pm \phi) \geq l_o \qquad (1);$$

$$a \cos (\omega Tsn \pm \phi) \geq -l_o \qquad (2).$$

If the case of Eq. (1) is now considered, it can be changed to the following Equation (3):

$$\cos (\omega Tsn \pm \phi) \geq l_o/a \qquad (3).$$

This Eq. (3) can be expressed in a different form s in the following Equation (4):

$$-\cos^{-1}(l_o/a) + 2\pi N \leq \omega Tsn \pm \phi \leq \cos^{-1}(l_o/a) + 2\pi N \qquad (4)$$

wherein N denotes a positive integer.

Therefore, if the members $\cos^{-1}(l_o/a)$, $\cos^{-1}(-l_o/a)$ and $1/\omega Ts$ are denoted by $\beta$, $\gamma$ and $\alpha$, Eq. (4) can be expanded in the following Equations (5) to (7):

$$-\beta + 2\pi N \leq \pi Tsn \pm \phi \leq \beta + 2\pi N \qquad (5);$$

$$-\beta \pm \phi + 2\pi N \leq \omega Tsn \leq \beta \pm \phi + 2\omega N \qquad (6);$$

$$\alpha(-\beta \pm \phi + 2\pi N) \leq n \leq \alpha(\beta \pm \phi + 2\pi N) \qquad (7).$$

On the other hand, Eq. (2) can be similarly expanded to obtain the following Equation (8):

$$\alpha(\gamma \pm \phi + 2\pi M) \geq n \geq \alpha[-\gamma \pm \phi + 2\pi(M+1)] \qquad (8),$$

wherein M denotes a positive integer.

By solving Eqs. (7) and (8), the sampling number $n_1$ until the positive threshold value $l_o$ is exceeded can be deduced from Eq. (7), whereas the sampling number $n_2$ until the negative threshold value $-l_o$ is exceeded can be deduced from Eq. (8). The smaller value of these sampling numbers $n_1$ and $n_2$ is the desired sampling number n.

A time longer than that corresponding to the sampling number n thus far determined will be called a deciding limit. Generally speaking, since the input to the limiter cannot be said to be ideal sine waves, the deciding limit is made slightly longer than n.

In the embodiment of the present invention, therefore, the period from the time when the input signals exceed the threshold value $l_o$ to the time when they again exceed the same is measured. If the time period is within the deciding limit, it is assumed that signals having a level higher than the threshold value $l_o$ are fed during that period. Then, the value $+l_o$ or $-l_o$ is generated in accordance with the plus and minus signs of the input signals. If, on the other hand, the aforementioned period exceeds the deciding limit, the input signals are generated as they are or signals at 0 level are generated.

By constructing the limiter in the manner thus far described, even if there is little information per wave of the input signals and if there exists no sampling point during the period while the input signals exceed the threshold values, the frequency component of the input signals can be transmitted accurately to the subsequent stage. Therefore, the frequency detection can be accomplished sufficiently accurately even if the sampling frequency is converted from 8 KHz or multiples thereof to 4 KHz.

Figure 6:
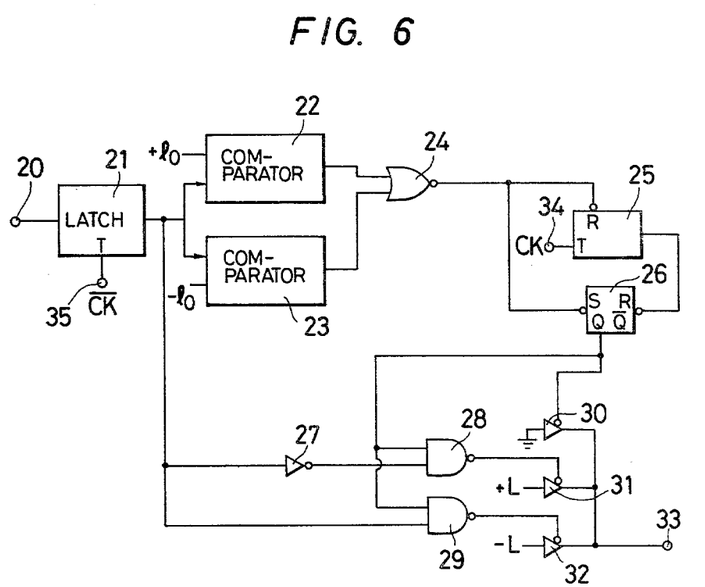
FIG. 6 is also a block diagram but shows one example of the limiter of the present invention based upon the principles illustrated in FIG. 5.

FIG. 6 shows the construction of one example of the aforementioned limiter. Reference numeral 20 indicates an input terminal at which the signals from the filter 4 or 5 of FIG. 2 are received. Numeral 21 indicates a latch. Numerals 22 and 23 indicate comparators for effecting comparisons with the positive and negative threshold values $+l_o$ and $-l_o$, respectively. Numerals 24, 25, 26 and 27 indicate a NOR circuit, an N notation counter, a flip-flop and an inverter, respectively. Numerals 28 and 29 indicate AND circuits. Numerals 30 to 32 indicate three state buffer gates. Numeral 33 indicates an output terminal. Numerals 34 and 35 indicate input terminals at which clock signals CK and their inverted clock signals $\overline{CK}$ are received, respectively.

With the above circuit construction, when the input signals from the frequency band elimination filter 4 or 5 shown in FIG. 2 are fed through the input terminal 20, they are fed to the latch 21 in response to the inverted clock signals $\overline{CK}$ from the input terminal 35. In the comparators 22 and 23, respectively, the input signals fed to the latch 21 are compared with the positive and negative threshold values $+l_o$ and $-l_o$. In case the input signals exceed those threshold values, logic values "1" are generated from the respective comparators and are fed to the OR circuit 24. Then, the N notation counter 25 is reset, and the flip-flop 26 is set by the output of the OR circuit 24. As a result, the terminal output of the flip-flop 26 thus set assumes the logic value "1" and is fed to the AND gates 28 and 29. In this instance, the AND gate 28 is fed with the signals which are inverted from the sign colons of the input signals from the latch 21 by the action of the inverter 27, whereas the other AND gate 29 is fed with the sign colons of the input signals as they are. Here, it is assumed that the logic value "0" is taken by the sign colons in case the input signals are positive and that the logic value "1" is taken in case the input signals are negative. As a result, if the input signals are positive, the buffer gate 31 is opened by the action of the AND circuit 28 so that the positive level $+L$ is fed to the output terminal 33. If, on the contrary, the input signals are negative, the buffer gate 32 is opened by the action of the AND circuit 29 so that the negative level $-L$ is fed to the output terminal 33.

On the other hand, when the N notation counter 25 is reset in response to the output from the NOR circuit 24, it starts its counting operation of the clock signals CK from the input terminal 34. During the period when the counted value does not reach the counted value N corresponding to the aforementioned deciding limit, the flip-flop 26 is under its set state so that the value corresponding to the positive or negative sign of the input signal is generated at the output terminal 33, as has been described before. When the input signals again exceed the positive or negative threshold value $+l_o$ or $-l_o$ within the deciding limit, the N notation counter 25 is reset again so that the clock signals are newly counted. If, on the contrary, the input signals fail to exceed again the positive or negative threshold value $+l_o$ or $-l_o$ within the deciding limit, the flip-flop 26 is reset in response to the output from the counter 25, when the deciding limit is reached, so that the logic value "0" is generated therefrom to open the buffer gate 30, thus establishing the earth or 0 potential at the output terminal 33.

The deciding limit to be preset in the counter 25 can be theoretically calculated, as has been described before, from the frequency of the PB signals, the sampling frequency, the threshold values and the like.

For example, it is assumed that the threshold values are preset lower by 2.5 dB than the minimum detection level and that the input signals have the ideal sine waves of the PB signal frequency, then the deciding limit takes a value of 0.5 to 1 ms.

In the aforementioned example, the description is made of the case in which the earth potential is generated through the buffer gate 30 when the state in which the input signals are below the threshold values continues longer than the deciding limit. In an alternative, however, the input signals fed to the latch 21 may be generated as they are, or other signals at a preset level may be generated.

Figure 7:
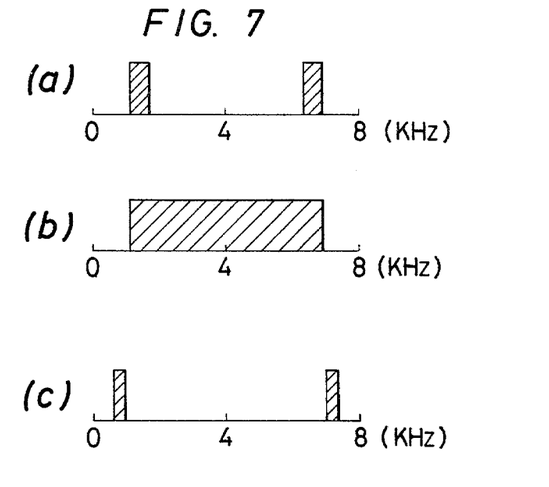
FIGS. 7, consisting of a–c, and 8, consisting of a–d, are charts illustrating the frequency characteristics of a frequency band separating filters according to the prior art and the present invention.

In the example according to the prior art, moreover, as shown in FIG. 1, the digitally converted PB signals which have been sampled with a frequency of 8 KHz and fed thereto are fed through a dial tone elimination filter 2 to the high and low frequency group elimination filters 4 and 5 so that they are separated into the two low and high frequency groups. FIG. 7 illustrates the ideal frequency characteristics of the frequency band pass filter at that time.

Generally speaking, for the purpose of separating and filtering the low frequency groups only, it is possible to use a filter which has characteristics as shown in FIG. 7(b). On the other hand, for the purpose of allowing the audio signals having a frequency higher than 3 KHz to pass with a view to preventing speech immunity, a frequency band elimination filter having the characteristics shown in FIG. 7(b), i.e., the high frequency group elimination filter 4 is required.

For the high frequency group separation, on the other hand, a frequency band elimination filter having the characteristics shown in FIG. 7(c), i.e., the low frequency group elimination filter 5 is likewise used.

In case, however, such frequency band elimination filter is used, the construction of the filter becomes complex so that the filter such as the aforementioned sixth order recursive digital filter has to be incorporated. Therefore, in case the second order recursive filters, as have been disclosed in Japanese Laid-Open Patent Publication No. 52-44106, are commonly used to construct each of the filters, the times of multiplications per one signal are 12 so that the time period required for their processing is accordingly elongated.

Figure 8:
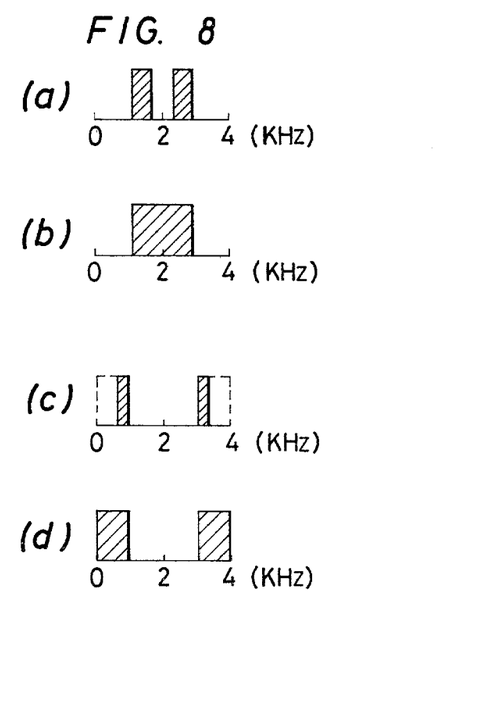

FIG. 8 illustrates the frequency characteristics of the frequency band pass filter in case the PB signals fed are resampled with the frequency of 4 KHz by the use of the resampling circuit 13 and are then separated and extracted into the two low and high frequency groups in accordance with the embodiment of the present invention.

First of all, in case the low frequency groups are separated and extracted from the input signals, the sampling frequency has a value of 4 KHz so that the frequency characteristics when the high frequency group elimination filter is used are illustrated in FIG. 8(a). In view of these frequency characteristics, it is found that the band pass width in the vicinity of 2 KHz is narrow and is effectively lower than 400 Hz and that the speech immunity preventing effects are little. As illustrated in FIG. 8(b), therefore, there arises no substantial problem in the frequency characteristics of the low pass type. In this case, moreover, the signals higher than 3 KHz are allowed to pass so that there is little problem in the prevention of speech immunity. As the low frequency group separation filter, therefore, a low frequency group pass filter having the characteristics, are shown in FIG. 8(b), is found to suffice for this purpose.

In the case of the separation and extraction of the high frequency groups, on the other hand, when the signals which have been sampled at the frequency of 4 KHz are filtered through the low frequency group elimination filter, the resultant frequency characteristics have the shape, as shown in solid lines in FIG. 8(c). As has been described, however, by the passage through the dial tone elimination filter at the previous stage, the portion shown in broken lines in FIG. 8(c) is also substantially attenuated. Therefore, as shown in FIG. 8(d), there arises no practical problem in the frequency characteristics of the high band pass type. With such characteristics, moreover, since the signals having a frequency in the vicinity of 3 KHz, which are necessary for emphasizing the third format having an effect to prevent speech immunity, are allowed to pass, there arise little problems in the prevention of erroneous operations. As the high frequency group separating filter, therefore, a high pass filter for the high group having the characteristics illustrated in FIG. 8(d) is found sufficient for this purpose.

Figure 9:
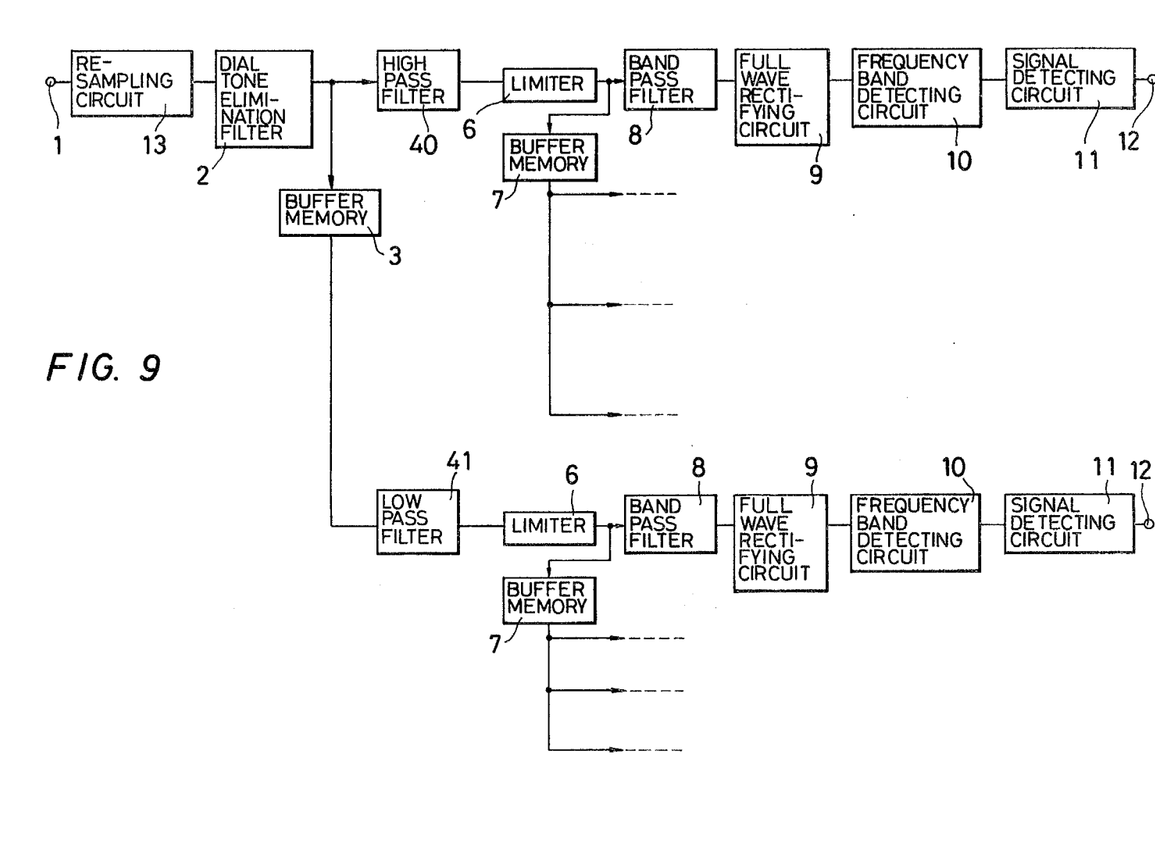
FIG. 9 is also a block diagram but shows another embodiment of the multi-frequency signal receiver according to the present invention.

FIG. 9 shows another embodiment of the PB signal receiver, which is devised in view of the aforegoing points according to the present invention. The embodiment to be described is made different from the first embodiment shown in FIG. 2 in that the high and low frequency group elimination filters 4 and 5 of FIG. 2 are replaced by high and low frequency pass filters 40 and 41 having such frequency characteristics as are illustrated in FIGS. 8(b) and 8(a).

In the second embodiment shown in FIG. 9, the signals having the sampling frequency of 8 KHz or multiples thereof are fed to the input terminal 1 and are converted by the resampling circuit 13 into the signals having the sampling frequency of 4 KHz. These resultant signals are fed through the dial tone elimination filter of the high frequency band pass type so that they are divided into halves, which are then fed to the high frequency pass filter 40 and the low frequency pass filter 41. As a result, the input signals are separated into the two high and low frequency groups. The subsequent signal processings are similar to the those of the first embodiment of FIG. 2 and such being the case their repeated descriptions are omitted here.

The aforementioned high and low frequency pass filters 40 and 41 can be realized with the simpler construction than that of the frequency band elimination filter shown in FIG. 2. For example, in case the aforementioned second order recursive digital filters are commonly used, these filters can be constructed of the fourth order recursive digital filters, respectively. As a result, the times of multiplications per signal can be remarkably reduced to eight so that the more multiple processing can be realized.

According to the present invention thus far described, for example, the signals of eight lines can be multiply processed (On the contrary, the multiple processings of two to four lines at most can be accomplished according to the prior art.) so that the multiple processing capacity can be remarkably improved according to the present invention.

In the foregoing embodiments, incidentally, although the description relates to a PB signal receiver, it should be understood that the present invention is not limited to such application but can be applied to another receiver, e.g., an MF signal receiver.

In the foregoing embodiments, moreover, the sampling frequency of 8 KHz or a multiple thereof of the input signals is converted into that of 4 KHz. However, it should also be understood that the present invention is not limited to such application but can be applied to a modification, in which the input signals are resampled with the 1/n frequency of the sampling frequency of the input.

As has been described hereinbefore, the present invention can enjoy the advantage that the processing quantity per signal can be reduced to remarkably increase the multiplicity so that the cost for a receiver per line can be reduced to a remarkably extent.

What is claimed is:

1. A multi-frequency signal receiver comprising: input means for inputting digital input signals which have been sampled at a first sampling frequency $f_1$; resampling means connected to said input means for resampling the digital input signals at a second sampling frequency $f_2$ which has a value of $f_1/n$, wherein n denotes an integer having a value of 2 or larger; and digital filter means for selecting signals in predetermined frequency bands among the digital input signals resampled by said resampling means to identify the frequency of the digital input signals.

2. A multi-frequency signal receiver according to claim 1, wherein the second sampling frequency $f_2$ of said resampling means is 4 KHz.

3. A multi-frequency signal receiver according to claim 1 or 2, wherein said digital input signals are push button signals.

4. A multi-frequency signal receiver according to claims 1 or 2, in which said digital filter means includes low and high pass filters for separating frequency groups among the input signals resampled by said resampling means and band pass filters for selecting signals in predetermined frequency bands among the digital input signals selected by said low and high pass filters.

5. A multi-frequency signal receiver comprising: input means for inputting digital input signals which have been sampled at a first sampling frequency $f_1$; resampling means connected to said input means for resampling the digital input signals at a second sampling frequency $f_2$ which has a value of $f_1/n$, wherein n denotes an integer having a value of 2 or larger; limiter means for generating positive or negative signals of a preset limit level in response to the polarity of the digital input signals resampled by said resampling means, when the time period between the time the input signals from the resampling means exceeds a preset positive or negative threshold value to the time the input signals again exceed the same threshold value is within a predetermined limit, and for generating signals of a preset level in the case where said time period exceeds the predetermined limit; and digital filter means for selecting signals in predetermined frequency bands among the digital input signals from said limiter means to identify the frequency of the input signals.

* * * * *